United States Patent [19]

Lee et al.

[11] 4,310,591
[45] Jan. 12, 1982

[54] SECURITY PAPER FROM FILM-FIBRIL SHEETS

[75] Inventors: Chi C. Lee, Richmond, Va.; Richard E. Ludwig, Newtown Square, Pa.

[73] Assignee: E. I. Du Pont de Nemours and Company, Wilmington, Del.

[21] Appl. No.: 181,957

[22] Filed: Aug. 28, 1980

Related U.S. Application Data

[63] Continuation-in-part of Ser. No. 7,707, Jan. 30, 1979, Pat. No. 4,247,318.

[30] Foreign Application Priority Data

Jan. 28, 1980 [IN] India .................................. 0102/80

[51] Int. Cl.³ .................. B32B 5/16; D04H 1/04; D21D 3/00; D21H 3/82
[52] U.S. Cl. .................. 428/283; 162/157 R; 162/158; 162/162; 428/286; 428/296; 428/323; 428/516; 428/916
[58] Field of Search ............. 156/62.2, 85, 163, 308.2, 156/306, 312, 160, 164; 162/157 R, 158, 162; 428/156, 168, 172, 283, 286, 323, 516, 916, 296

[56] References Cited

U.S. PATENT DOCUMENTS

| | | | |
|---|---|---|---|
| 34,634 | 3/1862 | Hayward | 162/140 |
| 1,929,828 | 10/1933 | Schlitz | 283/8 B |
| 2,379,443 | 7/1945 | Kantrowitz et al. | 162/140 |
| 3,037,004 | 5/1962 | Wood | 526/92 |
| 3,169,899 | 2/1965 | Steuber | 428/198 |
| 3,442,740 | 5/1969 | David | 156/181 |
| 3,478,141 | 12/1969 | Dempsey et al. | 264/284 |
| 3,615,996 | 10/1971 | Hasegawa et al. | 156/164 |
| 3,880,706 | 4/1975 | Williams | 162/103 |
| 4,069,078 | 1/1978 | Marder et al. | 156/181 |

FOREIGN PATENT DOCUMENTS 1347240 11/1963 France .................................. 428/201

OTHER PUBLICATIONS

Du Pont Technical Bulletin TK-3, "Properties and Processing of 'Tyvek' Spunbonded Olefin", Dec. 1978.

Primary Examiner—Bruce H. Hess

[57] ABSTRACT

A security paper is provided in which identifying material is contained as an intercalary layer within the thickness of a bonded, nonwoven, polyethylene-film-fibril sheet having an opacity of at least 70% and a delamination resistance of at least 60 grams per centimeter. A process for making such paper includes forming an assembly of two unbonded, lightly consolidated, nonwoven, polyethylene film-fibril sheets containing identifying material between them, compressing the assembly in an unheated nip at 17 to 85 kilograms per centimeter of assembly width and then self-bonding the compressed assembly while under restraint by contact with a heated drum. Such security paper is useful for bank notes, stock certificates, paper currency and the like.

2 Claims, 3 Drawing Figures

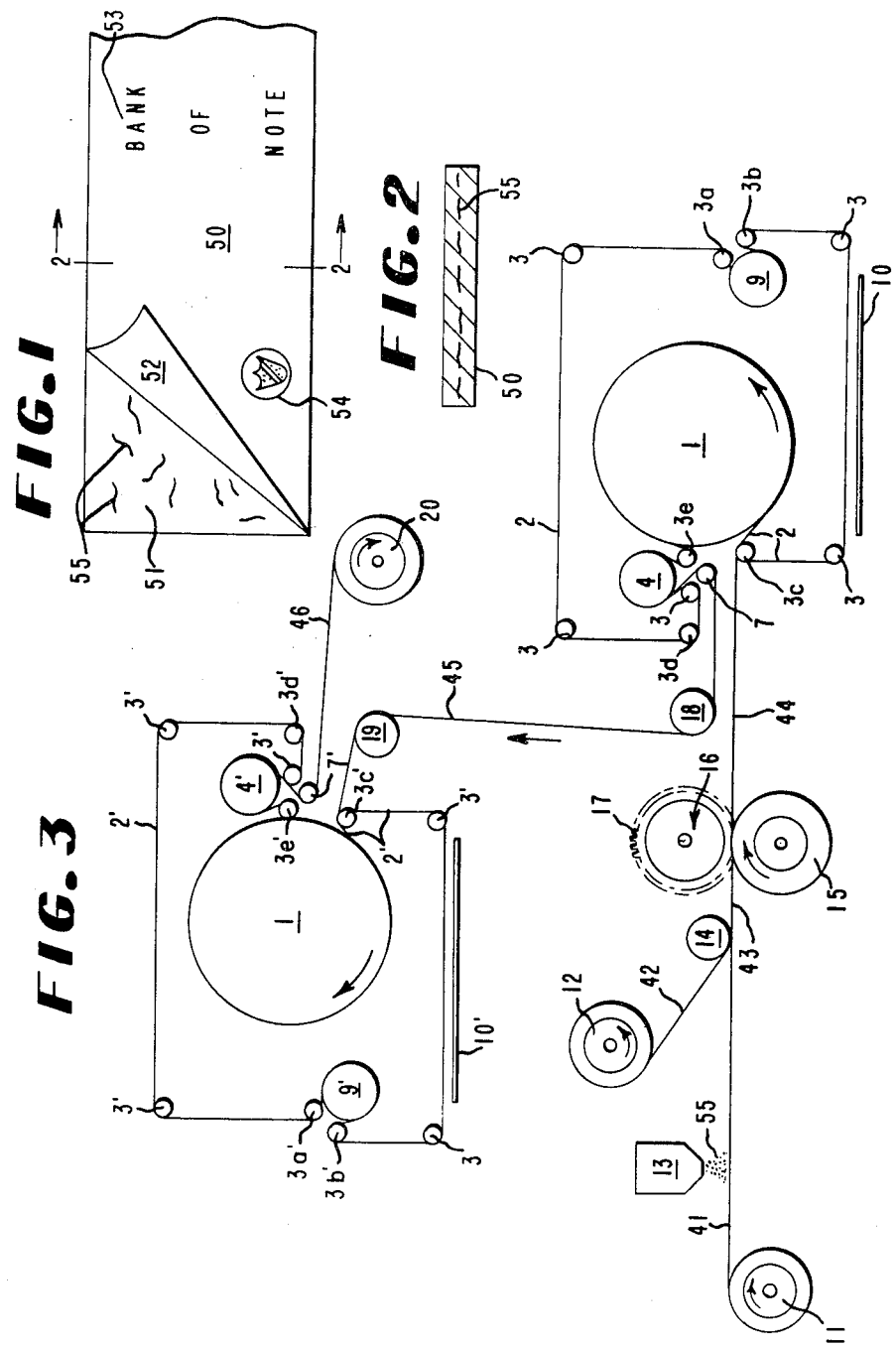

SECURITY PAPER FROM FILM-FIBRIL SHEETS

CROSS-REFERENCE TO RELATED APPLICATION

This is a continuation-in part of application Ser. No. 007,707 filed Jan. 30, 1979, now U.S. Pat. No. 4,247,318.

BACKGROUND OF THE INVENTION

1. Field of the Invention

This invention relates to security paper and in particular concerns security paper made from nonwoven film-fibril sheets.

2. Description of the Prior Art

Security paper is used in the production of printed items that represent sufficient value to make them a temptation to forgery. In the past, security paper has been produced from high quality cellulosic papers. Usually these security papers include specific features or materials that are readily identifiable but very difficult to reproduce. The manufacture of many security papers involves spreading or distributing minor amounts of the identifiable materials in the paper pulp during the wet-consolidation of the pulp on a paper-making machine. Among the special identifying materials that have been included in security papers are fibrous material in various shapes, colored particles, silk threads, particles containing certain inorganic substances, fluorescent fibers, metallized fibers, metal wires, various non-fibrous thermoplastic materials and the like. Such identifying materials have been distributed throughout the security paper or have been contained in a layer near the midplane of the paper. Watermaking also has been used to provide special designs on the paper. Such security papers have found use in bank notes, paper currency, stock certificates, bonds, legal documents, passports, visas, travel tickets and the like.

French Pat. No. 1,347,240 discloses a process for preparing security paper. In this process nonwoven webs that contain bondable thermoplastic fibers are assembled with a discontinuous intercalary layer of identifying material and then bonded by means of heat and/or pressure. However, the patent does not disclose nonwoven sheets made of polyethylene film-fibrils nor how to prepare security paper therefrom.

Nonwoven sheets made from polyethylene film-fibrils are known, per se, from, for example, Steuber U.S. Pat. No. 3,169,899. Various methods of bonding such sheets are known, as, for example, from David U.S. Pat. No. 3,442,740. However, none of these patents concerning nonwoven sheets made from polyethylene film fibrils disclose the use of such sheets for security papers.

Applicant has now invented a process whereby a specific type of nonwoven polyethylene film-fibril sheet can be used to make a novel, strong, durable, high quality, security paper.

SUMMARY OF THE INVENTION

The present invention provides an improved security paper of the type made from bonded webs containing thermoplastic fibers and an intercalary layer of identifying material. The improvement comprises webs consisting essentially of self-bonded nonwoven polyethylene film fibrils and the paper having an opacity of at least 70% and a delamination resistance of at least 60 grams per centimeter in the plane of the layer containing the identifying material. Among the preferred characteristics of the security paper of this invention are a basis weight of 50 to 150 grams per square meter, a toughness of at least 25 centimeter-grams per square centimeter per $g/m^2$, a tensile strength of at least 100 grams per centimeter per $g/m^2$, an Elmendorf tear of at least 3 grams per $g/m^2$ and a surface abrasion resistance of at least 5. Preferred identifying materials include colored polymers in the form of discrete film particles or short fibers. It is also preferred that the identifying materials amount to no more than about 0.5 percent of the total weight of the security paper. In another embodiment of the invention, the security paper also carries an embossed pattern on its surface.

The present invention also provides a process for preparing security paper wherein webs containing bondable thermoplastic fibers are assembled with a discontinuous intercalary layer of identifying material and are then bonded, characterized by the following steps in sequence:

(1) assembling the intercalary layer of identifying material with a first and second unbonded, lightly consolidated, nonwoven polyethylene film-fibril sheet, each sheet having a basis weight in the range of 25 to 75 grams per square meter and a density in the range of 0.15 to 0.30 grams per cubic centimeter;

(2) passing the sheet assembly through an unheated nip which applies a compression in the range of 17 to 85 kilograms per centimeter width of treated sheet to form a lightly laminated sheet assembly; and (3) self-bonding the lightly laminated sheet assembly by passing the assembly, while under compressive restraint, through a heating zone and raising the temperature of one face of the assembly sufficiently to cause fusion of surface film fibrils so as to obtain an abrasion resistance of at least five cycles, and cooling the assembly while under restraint to a temperature below that at which the assembly distorts or shrinks substantially and then repeating the procedure of this step to treat the other face of the sheet assembly and to obtain a bonded sheet assembly having an opacity of at least 70% and a delamination resistance at the plane of the identifying material of at least 60 grams per centimeter. In a preferred embodiment of the process, the unheated nip is used to provide an embossed pattern on the sheet, and the compression applied by the nip is in the range of 45 to 70 kilograms per centimeter.

BRIEF DESCRIPTION OF THE DRAWINGS

The invention will be more readily understood by reference to the drawings, in which:

FIG. 1 is a plan view of a bank note made with security paper of the present invention;

FIG. 2 is a section view of the bank note of FIG. 1; and

FIG. 3 is a flow diagram of a continuous process for making security paper according to the present invention.

DETAILED DESCRIPTION OF THE INVENTION

In the plan view of FIG. 1, an edge of the illustrated bank note made from security paper of the present invention is delaminated and partially rolled back to reveal the identifying material 55, which in this illustration is in the form of short colored fibers located between the two partially separated layers 51 and 52 of the bonded nonwoven polyethylene film fibril sheet 50.

Printing 53 and an embossed pattern 54 are shown on the surface of the bank note. FIG. 2, which is a cross-section of the bank note taken at Section 2—2 of FIG. 1 through the thickness of the bank note, shows the identifying material 55 located in a horizontal plane, in this case at the midplane of the sheet thickness, of the bonded, nonwoven polyethylene film-fibril sheet 50.

The main body of the security paper of the invention is a bonded nonwoven sheet of polyethylene film fibrils. The sheet is self-bonded; that is, no additional binders or adhesives are employed to obtain the bonded structure. Generally, the polyethylene film fibrils are in the form of plexifilamentary strands, such as those disclosed in U.S. Pat. No. 3,081,519, which strands are then formed into sheets and subsequently bonded. The film fibrils are very thin ribbon-like fibrous elements, usually less than 4-microns thick, as measured with an interference microscope. Within the plexifilamentary strand, the film fibrils are interconnected and form an integral network.

As used herein, polyethylene is intended to embrace not only homopolymers of ethylene but also copolymers wherein at least 85% of the recurring units are ethylene units. The preferred polyethylene polymer is a homopolymeric linear polyethylene which has an upper limit of melting range of about 130° to 135° C., a density in the range of 0.94 to 0.98 grams per cubic centimeter and a melt index (ASTM method D-1238-57T, Condition E) of 0.1 to 6.0.

To function satisfactorily in its intended use, it has been found that the present security paper should have an opacity of at least 70%, preferably greater than 75%, and a delamination resistance in the plane of the identifying material of at least 60 grams per centimeter, preferably greater than 120 g/cm. Such self-bonded nonwoven sheets of polyethylene film fibrils are generally white, opaque, and smooth. They are also strong, tough, tear resistant and abrasion resistant. For optimum performance, the security paper of this invention preferably has a tensile strength of at least 100 $g/cm//g/m^2$, a toughness of at least 25 cm $g/cm^2//g/m^2$, an Elmendorf tear of at least 3 $g//g/m^2$, and an abrasion resistance of at least 5 cycles, as well as a surface tension of at least 45 dynes/cm, the latter for good printability and ink adhesion. The preferred basis weight for the security paper is in the range of 50 to 150 $g/m^2$, although security paper outside this weight range can also perform satisfactorily. Methods for determining the aforementioned characteristics and properties are described in detail hereinafter.

The security paper of this invention is extraordinarily strong. It is nearly impossible to tear by hand. For example, as compared to 82 $g/m^2$ Kraft paper which has a toughness of about 0.07 cm $kg/cm^2$ and 94 $g/m^2$ woven cotton sheeting which has a toughness of about 0.3 cm $kg/cm^2$, security paper of the present invention weighing 87 $g/m^2$ has a toughness of about 2.3 cm $kg/cm^2$.

The identifying material within the security paper can be of any of the known materials used in the art or can be printing on an inner plane of the paper, said inner plane, as will be noted below, having been provided by the surface of one of the starting sheets from which the security paper is made. In preferred embodiments, the identifying material is in the form of short, low denier, colored or dyed fibers or threads or of discrete particles, called planchets, of colored or dyed film and is visible through the sheet surfaces. Usually, very little identifying material is necessary in the security paper, based on the total weight of the paper. Preferably, in the present security paper, the identifying material amounts to no more than about 0.5% of the total weight. Much larger amounts, e.g., 1% or greater, can be used, but the presence of very small amounts of identifying matter minimizes any detrimental effects the identifying matter might have on the bonding of the film fibrils in the sheet and on the delamination resistance. In the present invention, the identifying material is located in a plane of the thickness of the security paper rather than being uniformly or randomly distributed throughout the paper.

The security paper of the invention can also bear unique, readily identifiable embossed patterns on its surface. The embossed pattern can be either more or less opaque than the background.

A continuous process by which the security paper of the present invention can be made is given in the flow diagram of FIG. 3. The starting materials for the process include two rolls 11 and 12 of unbonded nonwoven polyethylene film-fibril sheet 41 and 42 which can be prepared by the general methods described in U.S. Pat. No. 3,169,899. According to a preferred method of this type for making the unbonded sheets, a polymer of linear polyethylene having a density of 0.95 $g/cm^3$, a melt index of 0.9, as determined by ASTM method D-1238-57T, Condition E, and an upper limit of the melting range of about 135° C. is flash-spun from a 12% solution of the polymer in trichlorofluoromethane. The solution is continuously pumped to spinneret assemblies at a temperature of 179° C. and a pressure above about 85 atmospheres. The solution is passed in each spinneret assembly through a first orifice to a pressure let-down zone and through a second orifice into the surrounding atmosphere. The resulting film-fibril strand is spread and oscillated by means of a shaped rotating baffle, is electrostatically charged, and then is deposited on a moving belt. The spinneret assemblies are spaced to provide overlapping intersecting deposits on the belt to form a batt. The batt is then lightly consolidated by passage through a nip that applies to the batt a compression of about 1.8 kg/cm of batt width to form a lightly consolidated sheet. This lightly consolidated sheet is slit longitudinally to provide two rolls of sheet. The two rolls serve as the first and second unbonded, lightly consolidated, nonwoven, polyethylene film-fibril sheets intended as starting materials for the process of the present invention. Generally, such sheets having a basis weight in the range of 25 to 75 $g/m^2$ and a density in the range of 0.15 to 0.3 $g/cm^3$ are suitable for use in the present process.

As shown in FIG. 3, the first unbonded, lightly consolidated, nonwoven, polyethylene film-fibril sheet, 41, is fed horizontally from roll 11 past a position where means 13 are provided for depositing identifying material 55 into sheet 41. The second such sheet 42 is fed from roll 12 under roll 14 so that sheet 42 is positioned directly atop the surface of sheet 41 which is carrying the identifying material 55 to form a sheet assembly 43.

Sheet assembly 43 is then compressed by passage through the nip formed by rolls 15 and 16. Roll 16 is of hard metal and optionally carries an embossing pattern or embossing plate 17, also of hard metal, on its surface. Roll 15 has a surface of hard rubber or other material which provides the roll with a Shore durometer hardness of at least about 70 D (as measured according to the test descriptions in ASTM D-1706-61 and in D-1484-59). The optional embossing pattern on roll 16 can provide additional identifying marks on the security paper. A wide variety of embossing patterns can be used.

Raised patterns, providing projections of 0.13 to 0.25 mm above the remaining surface of the embossing surface 17 provide the sheet with embossed patterns that are less opaque than nonembossed (i.e., background) areas on the finished security papers. Patterns recessed within the roll surface 17 by 0.13 to 0.25 mm result in corresponding areas in the finished security paper having greater opacity than the background.

No heating is supplied to the nip formed by rolls 15 and 16. In performing the cold compression, whether with or without embossing, the nip applies sufficient compression to sheet assembly 43 to form an integral, lightly laminated sheet assembly 44, but not so much compression as to cause excessive reduction in the opacity of the finished security paper. Generally, compressions in the range of 17 to 85 kilograms per centimeter width of sheet assembly are used for this operation, with compressions of 45 to 70 kg/cm being preferred.

The lightly laminated assembly 44 emerging from the nip still is not bonded, but it has a sufficient delamination resistance to be handled as a unitary structure. Generally, assembly 44 has a delamination resistance of about 15 grams per centimeter, or more. Although assemblies 44 having much lower delamination resistances can be handled as unitary structures, if sufficient care is taken, such assemblies subsequently do not bond adequately at the interface of the two film-fibril sheets.

Lightly laminated sheet assembly 44 is then forwarded to a first and second bonder, each of which operates substantially as described in U.S. Pat. No. 3,442,740. Each bonder is essentially a modification of a Palmer apparatus of the type commonly used in textile finishing operations.

The main heating element in the first bonder is a rotating drum 1 which is internally heated by steam. A heavy endless belt 2 of felt or other material, which is driven by drum 1, passes around the drum and by means of several idler rolls 3, 3a, 3b, 3c, 3d and 3e is continually fed back to the heated drum. Certain idler rolls are adjustable to enable control of belt tension. Belt 2 after passing around drum 1, goes around cooling roll 4.

In the operation of the bonder, lightly laminated sheet assembly 44 passes around idler roll 3c and is carried into the nip between the heated drum and the endless belt. Assembly 44 is passed around the heated drum and then around idler roll 3e to cooling roll 4 and then separated from the moving belt at idler roll 7. This provides a partially self-bonded sheet 45. Sheet 45 is then forwarded via rolls 18 and 19 to the second bonding unit which is identical to the first one and operates in a like manner except that the other face of the sheet comes into contact with the heated drum. All primed numeral designations of the second bonding unit correspond to the same parts of the equipment as designated in the first bonding unit. The self-bonded sheet 46 emerging from the second bonding unit is then wound up on roll 20. For certain operations it is desirable to preheat the heavy endless belt by means of preheat roll 9. The belts are guided onto the preheat roll by idler rolls 3a and 3b. Any heat lost may be compensated for by heated plate 10 underneath the belt.

The most important heat control in each bonder is maintained at the main drum. During operation, one side of the sheet is heated by the main drum to a temperature substantially equal to or slightly less than the upper limit of the melting range of the film fibril sheet. While this face of the polyethylene film-fibril sheet assembly is heated to a temperature at or near the upper limit of its melting range, the other face of the assembly (in contact with the belt) is kept at a somewhat lower temperature. The temperature of the face of the sheet in contact with the bonding drum is between 1 and 10° C. higher than the temperature of the other face of the assembly. By maintaining a temperature differential during bonding, a sheet is obtained having a greater abrasion resistance on the side nearest the hot drum. Thus, by passing the sheet through two bonders so that the sheet which had not been in contact with the heated drum in the first bonder is put in contact with the heated drum of the second bonder, products having good abrasion resistance on both sides are obtained.

During the passage of the film-fibril sheet assembly through the first and second bonder, the assembly is lightly compressed by tensioning belts 2 and 2' against drum rolls 1 and 1', respectively. This light compression need only be sufficient to prevent substantial shrinkage of the treated sheet, that is, to prevent a total area shrinkage of more than about 15%.

In operation of the above-described continuous process, sheet speeds in excess of 100 meters per minute can be employed satisfactorily. Bonder temperatures and residence times are arranged to provide the security paper with a delamination resistance of at least 60 g/cm and an opacity of at least 70%. Such conditions assure that the product of the process will also have good abrasion resistance and strength properties.

After the self-bonding operation is complete, each surface of the security paper can be given a Corona electric discharge treatment in a Lepel unit in order to provide the surfaces of the paper with a surface tension of at least 45 dynes/cm, which assures that the paper will have satisfactory printability and ink adhesion. Such results can be obtained with sheet speeds of about 45 to 55 m/min and a power of 1 kilowatt in a Lepel unit.

The various sheet characteristics referred to in the next and in the Examples below are measured by the following methods. In the test method descriptions TAPPI refers to the Technical Association of Pulp and Paper Industry and ASTM to the American Society of Testing Materials.

Opacity is determined by measuring the quantity of light transmitted through individual 5.1 cm (2 in.) diameter circular portions of the security paper by employing an E. B. Eddy Opacity Meter manufactured by Thwing Albert Instrument Company. The opacity of the sheet is determined by arithmetic averaging of at least fifteen such individual determinations. Note that when the security paper of the invention includes embossed areas, the opacity measurements should be made in the nonembossed areas.

Delamination resistance is measured by using an Instron Tester, 2.5 cm × 7.6 cm (1 in. × 3 in.) line contact clamps, and an Instron Integrator, all manufactured by Instron Engineering, Inc., Canton, Mass. Delamination of a 2.5 cm × 17.8 cm (1 in. × 7 in.) specimen is started manually across a 2.5 cm × 2.5 cm (1 in. × 1 in.) edge area at the plane of the sheet wherein the identifying material is located by splitting the sheet with a pin. The remaining 2.5 cm × 15.3 cm (1 in. × 6 in.) portion of the sheet remains unseparated. The following settings are employed with a "C" load cell: gauge length of 10.1 cm (4 in.), crosshead speed of 12.7 cm (5 in.) per minute, chart speed 5.1 cm (2 in.) per minute, and full scale load of 0.91 kg (2 lb). One end of one of the split layers is placed in each of the line clamps and the force required to pull the sheet apart is measured. Delamination resistance (kg/cm) equals the integrator reading divided by the appropriate conversion factor which depends upon load cell size and units of measurement.

Basis weight is measured by TAPPI-T-410 OS-61 or by ASTM D 646-50.

Density is determined from the basis weight and thickness of this sheet. The thickness is measured by means of a conventional thickness gauge (e.g., a Starrett gauge, made by L. S. Starrett Co., Athol, Mass., Catalog No. 170) which applies a pressure of about 180 grams/cm$^2$ to the sheet.

Tensile strength is measured by TAPPI-T-404 M-50 or by ASTM D828-48.

Toughness is measured by determining the area under the curve of tensile stress versus elongation determined by the Tappi or ASTM tests described for the tensile strength.

Elmendorf tear is measured by TAPPI-T-414 M-49.

Abrasion resistance is measured by means of a Crockmeter tester, S.N. CM-598 of Atlas Electric Device Company, Chicago, Ill. A 12.7 cm × 12.7 cm (5 in. × 5 in.) piece of silicon carbide paper is taped to the base of the Crockmeter directly under the full movement of the rubber foot. The carbide paper serves to prevent the sample from moving. A rubber disk, measuring 50-mm diameter × 10-mm thick is fastened to the swing bar of the Crockmeter. The disk is made of Eberhard Faber pink pearl No. 101 eraser. The swing bar handle is turned so that the rubber foot traverses back and forth across the surface of the sample. When the first surface fiber is disturbed (i.e. pops up), the number of cycles is determined from the counter on the instrument. The average number of cycles for five tests is reported for each sample.

EXAMPLE I

In each of the seven tests described in this example, the starting material is an unbonded, lightly consolidated, nonwoven, polyethylene film-fibril sheet, prepared by the general methods of U.S. Pat. No. 3,169,899, as hereinbefore described. The lightly consolidated sheet, which has a basis weight of 42.5 g/m$^2$ (1.25 oz/yd$^2$) and a density of about 0.25 g/cm$^3$, is slit to provide two rolls of 46-cm (18-in.) wide sheet. To produce security paper from these two rolls of sheet, the process of FIG. 3 is used, with the exceptions that the process is not continuous and the felt belts of the bonding units are not preheated. Instead of being continuously forwarded to the bonding units, the lightly laminated sheet assembly emerging from the unheated nip of rolls 15 and 16 is first collected and wound up on a roll prior to being self-bonded. In these tests, short colored threads or small pieces of colored thermoplastic film (i.e., planchets) are used for the identifying material and are incorporated into the security paper in an amount equal to about 0.12 g/m$^2$, or about 0.12% of the total weight of the final product in Sample 7 and in a somewhat lesser amount in the other examples.

For the light laminating or cold compression operation, the sheet assembly is passed at a speed of 13.7 m/min (15 yd/min) through the nip of rolls 15 and 16, which apply a compression, as indicated in Table I. The surface of metal roll 16 is provided with different embossing patterns for the various examples. Generally, raised embossing patterns (0.13 to 0.25 mm above the remaining surface of the roll) are believed to provide somewhat stronger lamination to the sheet assembly than equally recessed patterns or flat rolls operated at the same nip compression. In these tests, roll 16 is 30.5 cm (12 in.) in diameter and roll 15 is 25.4 cm (10 in.) in diameter.

The roll of lightly laminated (i.e., cold compressed) sheet assembly is then fed at a speed of 46 m/min (50 yd/min) to the bonding units. Saturated steam for heating the drums of the first and second bonder is maintained at a pressure of 2.58 and 2.65 atmospheres gauge (38 and 39 psig) respectively. Compressional restraint in the bonders is provided by 100% wool felt belts, each weighing about 3.6 kg/m$^2$ (108 oz/yd$^2$) and measuring about 0.6-cm ($\frac{1}{4}$-in) thick. The restraint provided by the belts prevents the sheet assembly from shrinking more than about 8% in each bonder.

After the self-bonding operation, each surface of the thusly produced security paper is given a Corona electric discharge treatment while passing at a speed of 46 m/min (50 yd/min) through a commercial Lepel unit operating at a 1 kilowatt power, to provide each surface of the paper with a surface tension in the range of 50 to 52 dynes/cm.

Additional details of the tests and characteristics of the resultant products are given in Table I. The identifying material is visible through the surfaces of the finished sheets. These sheets proved very satisfactory for use as security paper.

TABLE I

| Sample No. | 1 | 2 | 3 | 4 |
|---|---|---|---|---|
| Identifying Material[1] | P | P | P | P |
| Cold Compression | | | | |
| Emboss height, mm[2] | +0.13 | +0.18 | −0.18 | −0.18 |
| Compression, kg/cm | 55.6 | 55.6 | 55.6 | 55.6 |
| Bonded Sheet | | | | |
| Opacity, % | 83 | 83 | 76 | 75 |
| Delamination, g/cm[3] | 90 | 110 | 140 | 140 |
| Tensile, kg/cm[4] | 12.4 | 12.0 | 13.4 | 12.5 |
| Tear, kg[4] | 0.50 | 0.45 | 0.41 | 0.36 |
| Toughness, cm kg/cm$^2$[4] | 2.9 | 2.7 | 3.4 | 3.2 |
| Abrasion, cycles[5] | 12/9 | 37/9 | 22/10 | 25/19 |

| Sample No. | 5 | 6 | 7 |
|---|---|---|---|
| Identifying Material[1] | T | T | T |
| Cold compression | | | |
| Emboss height, mm[2] | +0.13 | +0.18 | +0.38 |
| Compression, kg/cm | 64.5 | 64.5 | 55.6 |
| Bonded Sheet | | | |
| Opacity, % | 82 | 73 | 75 |
| Delamination, g/cm[3] | 160 | 210 | 140 |
| Tensile, kg/cm[4] | 11.6 | 11.8 | 12.2 |
| Tear, kg[4] | 0.41 | 0.36 | 0.36 |
| Toughness, cm kg/cm$^2$[4] | 2.5 | 2.7 | 3.1 |
| Abrasion, cycles[5] | 10/9 | 27/16 | 25/9 |

Notes:
[1] P = planchets, T = threads or fibers.
[2] Distance emboss pattern is raised (positive) above or recessed (negative) below the remaining surface of the roll.
[3] Measured in the machine direction (length) of sheet.
[4] Average of machine direction and cross-machine direction measurements for 98 g/m$^2$ finished sheet.
[5] Value reported for each surface.

EXAMPLE II

A series of tests is run by substantially the same procedures and with the same starting sheets as for Sample 7 of Example I, except that the compression in the unheated nip is varied between 56 and 5 kg/cm of sheet assembly width, as indicated in Table II. Tests A through E are controls and are not of the invention. Tests 8 through 11 are in accordance with the invention. The delamination resistance and opacity of the resultant products and the frequency of blisters in the final products (i.e., nonbonded areas between the starting sheets) also are recorded in Table II. In these tests, the compression in the unheated nip is controlled within a range of about 1 kg/cm of the listed value.

As shown in Table II, tests 8 through 11, wherein the sheet assemblies are cold compressed at about 17 kg/cm or more before heat bonding, provide final products which have satisfactory delamination resistances (i.e., above about 60 grams/cm) and contain no blisters. In contrast, products from control tests A through E, wherein the sheet assemblies are cold compressed insufficiently, have inadequate delamination resistance and numerous blisters.

TABLE II

| Test No. | Cold Compression kg/cm | Delamination Resistance grams/cm | Opacity % | Blisters per square meter |
| --- | --- | --- | --- | --- |
| 8 | 56 | 160 | 75 | 0 |
| 9 | 21 | 89 | 88 | 0 |
| 10 | 18.5 | 89 | 87 | 0 |
| 11 | 16.5 | 71 | 91 | 0 |
| A | 14 | 54 | 90 | 90 |
| B | 12 | 36 | 92 | 100 |
| C | 9.5 | 36 | 92 | 160 |

TABLE II-continued

| Test No. | Cold Compression kg/cm | Delamination Resistance grams/cm | Opacity % | Blisters per square meter |
| --- | --- | --- | --- | --- |
| D | 7.5 | 54 | 92 | 180 |
| E | 5 | 36 | 92 | 220 |

We claim:

1. An improved security paper of the type made from bonded webs containing thermoplastic fibers and an intercalary layer of identifying material, the improvement comprising webs consisting essentially of self-bonded nonwoven polyethylene film fibrils, said webs and intercalary layer having been assembled under a cold compression of at least 17 kg/cm of assembly width during manufacture of the paper, and the paper having an opacity of at least 70% and a delamination resistance of at least 60 grams per centimeter in the plane of the layer containing the identifying material.

2. A security paper in accordance with claim 1 wherein the paper has a basis weight of 50 to 150 grams per square meter, a tensile strength of at least 100 grams per centimeter per $g/m^2$, a toughness of at least 25 centimeter-grams per square centimeter per $g/m^2$, an Elmendorf tear of at least 3 grams per $g/m^2$, and a surface abrasion resistance of at least 5 and the identifying material is a colored material in the form of discrete fibers or particles of film which material amounts to no more than about 0.5 weight percent of the paper.

* * * * *